US007185900B2

United States Patent
Bogatay, Sr. et al.

(10) Patent No.: US 7,185,900 B2
(45) Date of Patent: Mar. 6, 2007

(54) FRAME AND STEERING MECHANISM FOR THREE-WHEEL VEHICLE

(75) Inventors: Jeffrey J. Bogatay, Sr., Mentor, OH (US); Randall C. VanHorn, Akron, OH (US)

(73) Assignee: Cleveland T-Trike Manufacturing, Inc., Warrensville Heights, OH (US)

( * ) Notice: Subject to any disclaimer, the term of this patent is extended or adjusted under 35 U.S.C. 154(b) by 134 days.

(21) Appl. No.: 10/646,280

(22) Filed: Aug. 22, 2003

(65) Prior Publication Data
US 2004/0094350 A1     May 20, 2004

Related U.S. Application Data

(60) Provisional application No. 60/405,406, filed on Aug. 22, 2002.

(51) Int. Cl.
 *B62D 61/06* (2006.01)
(52) U.S. Cl. .................... 280/62; 280/93.502
(58) Field of Classification Search ............ 280/62, 280/93.502, 93.504, 93.505, 93.506, 93.507, 280/92, 781, 797, 270, 274; 180/210–211, 180/215, 311–312
See application file for complete search history.

(56) References Cited

U.S. PATENT DOCUMENTS 1,399,201 A * 12/1921 Fekete et al. ............... 280/797
2,696,272 A * 12/1954 Schlaphoff .................. 180/208
3,099,326 A * 7/1963 Weigel et al. .............. 180/214
4,353,567 A * 10/1982 Weldy ......................... 280/92
6,709,013 B2 * 3/2004 Renfroe et al. ............. 280/778

* cited by examiner

Primary Examiner—Paul N. Dickson
Assistant Examiner—Drew J. Brown
(74) Attorney, Agent, or Firm—Fay Sharpe Fagan Minnich & McKee; Karl W. Hauber

(57) ABSTRACT

A frame and steering arrangement for a three-wheel vehicle that includes a rigid, open box frame of a durable material. The open box frame includes primary and secondary side rails spaced from each other and joined at opposite ends by a front rail and a rear plate. A plurality of mounting components is provided to mount the vehicle engine on the frame adjacent the front rail. First and second support bars are mounted at lower ends on an upper edge of the primary side rails and the front rail and extend over and forwardly of the front rail of the frame. The first and second support bars at the upper ends are connected to a head tube to mount a front wheel assembly on the frame. A steering assembly is provided having a front steering bar to connect to the front wheel assembly. The steering assembly includes a rear mounting plate pivotal relative to the frame and located rearwardly of the front wheel assembly. A pair of connecting rods of different lengths are pivotally connected between the steering bar and the rear mounting plate whereby the mounting plate is pivotal about an axis laterally offset from the front wheel assembly.

16 Claims, 6 Drawing Sheets
(4 of 6 Drawing Sheet(s) Filed in Color)

FRAME AND STEERING MECHANISM FOR THREE-WHEEL VEHICLE

This application claims priority on application Ser. No. 60/405,406 filed Aug. 22, 2002 entitled "Frame and Steering Mechanism for Three-Wheel Vehicle".

This invention relates to motor vehicles, and more particularly to improvements for three-wheel passenger motor vehicles.

BACKGROUND OF THE INVENTION

Three-wheel vehicles that incorporate a motorcycle style front end generally use a rear mounted engine. Other three-wheel vehicle designs have incorporated an engine between the passenger compartment and front wheel; however, such designs generally result in a high center of gravity for the vehicle. The aforementioned designs result in three-wheel vehicles that are inherently less safe than automobiles and/or do not provide the performance characteristics of a motorcycle.

Achievement of a combination of the desirable features of both types of vehicles presents a number of difficult technical problems, particularly in relation to the frame and the steering of the vehicle. Thus, it has been difficult and not cost effective to provide a strong, durable, and safe frame construction, typical of an automobile, in a three-wheel vehicle that retains the performance characteristics of a motorcycle. Additionally, it has been difficult to provide a construction for a three-wheel vehicle that affords the operational stability and handling of an automobile in a construction having the performance characteristics of a motorcycle.

SUMMARY OF THE INVENTION

In accordance with the present invention, a novel frame and steering construction for a three-wheel vehicle is provided that overcomes or minimizes the problems and difficulties encountered with the use of vehicles of the foregoing character, while promoting the desired safe operation, stability, handling, and simplicity of construction.

The present invention is directed to improvements associated with three-wheel vehicles that include advances in the frame structure, steering mechanism of the vehicle, and overall improvements in stability and handling of the vehicle. The present invention is primarily directed to a three-wheel passenger vehicle that retains the performance characteristics of a motorcycle while at the same time, providing many of the basic safety features of a conventional automobile, and will be described with particular reference thereto. It will be appreciated that many aspects of this invention can be used in other types of vehicles.

The invention relates to a frame and steering construction for a three-wheel passenger vehicle comprising a rigid open box frame primarily of tubular metal and/or composite material comprising primary and secondary side rails spaced from each other and joined by a front rail, a rear rail, and at least one intermediate cross rail. The frame includes a plurality of mounting components for mounting to various other components of the vehicle such as, but not limited to, the vehicle body, the engine, the drive train, the front wheel assembly, etc.

The frame can also include a pair of support bars for the front wheel assembly. The bars are mounted on the upper edges of the primary side rails and front rail, where the primary side rails are joined to the front rail. The support bars generally extend over and forwardly of the front rail of the frame. The support bars are typically connected at the upper ends to a head tube for mounting the front wheel assembly.

The steering mechanism is primarily of tubular steel construction and at its front end includes a front steering bar for connection to the front wheel assembly of the vehicle. As can be appreciated, other or additional materials can be used. The steering mechanism is supported at the rear end by a rear mounting plate connected to the vehicle body proximate to the driver. The front steering bar and rear mounting plate have laterally opposite ends connected by a pair of connecting rods and a plurality of pivotal joints. In one non-limiting construction, the frame and steering construction includes a motorcycle handlebar rigidly connected to the rear mounting plate for controlling and steering the front wheel assembly. The steering mechanism provides for the handlebar axis to be offset laterally with respect to the front wheel so that the passenger compartment can seat the driver and a passenger side-by-side with the handlebar in front of the driver.

In another and/or alternative non-limiting construction, there is provided a frame and steering arrangement for a three-wheel vehicle that includes a rigid, open box frame of metal including primary and secondary side rails spaced from each other and joined at opposite ends by a front rail and a rear plate. A plurality of mounting components is provided for mounting the vehicle engine on the frame adjacent the front rail. First and second support bars are mounted at lower ends on an upper edge of the primary side rails and the front rail and extend over and forwardly of the front rail of the frame. The first and second support bars at the upper ends are connected to a head tube for mounting a front wheel assembly on the frame. A steering assembly is provided having a front steering bar for connection to the front wheel assembly. The steering assembly includes a rear mounting plate pivotal relative to the frame and located rearwardly of the front wheel assembly. A pair of connecting rods of different lengths pivotally connect between the steering bar and the rear mounting plate whereby the mounting plate is pivotal about an axis laterally offset from the front wheel assembly.

Still other benefits and advantages of the present invention will become apparent to those of ordinary skill in the art upon a reading and understanding of the following specification.

It is an object of the present invention to provide a new and improved frame and steering construction for a three-wheel vehicle that enables construction of a vehicle combining the performance of a motorcycle with the passenger-carrying characteristics of an automobile.

Another and/or alternative object of the present invention is to improve stability and handling of three-wheel vehicles on highways.

Another and/or alternative object of the present invention is to provide a frame that enables mounting of the engine system close to the front wheel to improve the stability of the vehicle.

A further and/or alternative object of the present invention is to provide a frame for a three-wheel vehicle that increases the safety of the occupants.

Yet another and/or alternative object of the present invention is to provide a frame that enables mounting of a motorcycle front wheel and associated front suspension.

A still further and/or alternative object of the present invention is to provide a frame for a three-wheel vehicle that enables a center of gravity close to the ground.

Yet still a further and/or alternative object of the present invention is to provide a steering mechanism that enables a longer wheelbase.

Yet a further and/or alternative object of the present invention is to provide a steering mechanism that enables a laterally off-center driver position with respect to the front wheel.

Yet another and/or alternative object of the present invention is to provide a steering mechanism which enables improved handling of a three-wheel vehicle.

BRIEF DESCRIPTION OF THE DRAWINGS

The patent or application file contains at least one drawing executed in color. Copies of this patent or patent application publication with color drawings will be provided by the Office upon request and payment of the necessary fee.

The invention may take physical form in certain parts and arrangements of parts, several preferred embodiments of which are described in the specification and illustrated in the accompanying drawings which form a part hereof and wherein.

DESCRIPTION OF A PREFERRED EMBODIMENT

Figures 1, 2, 4:
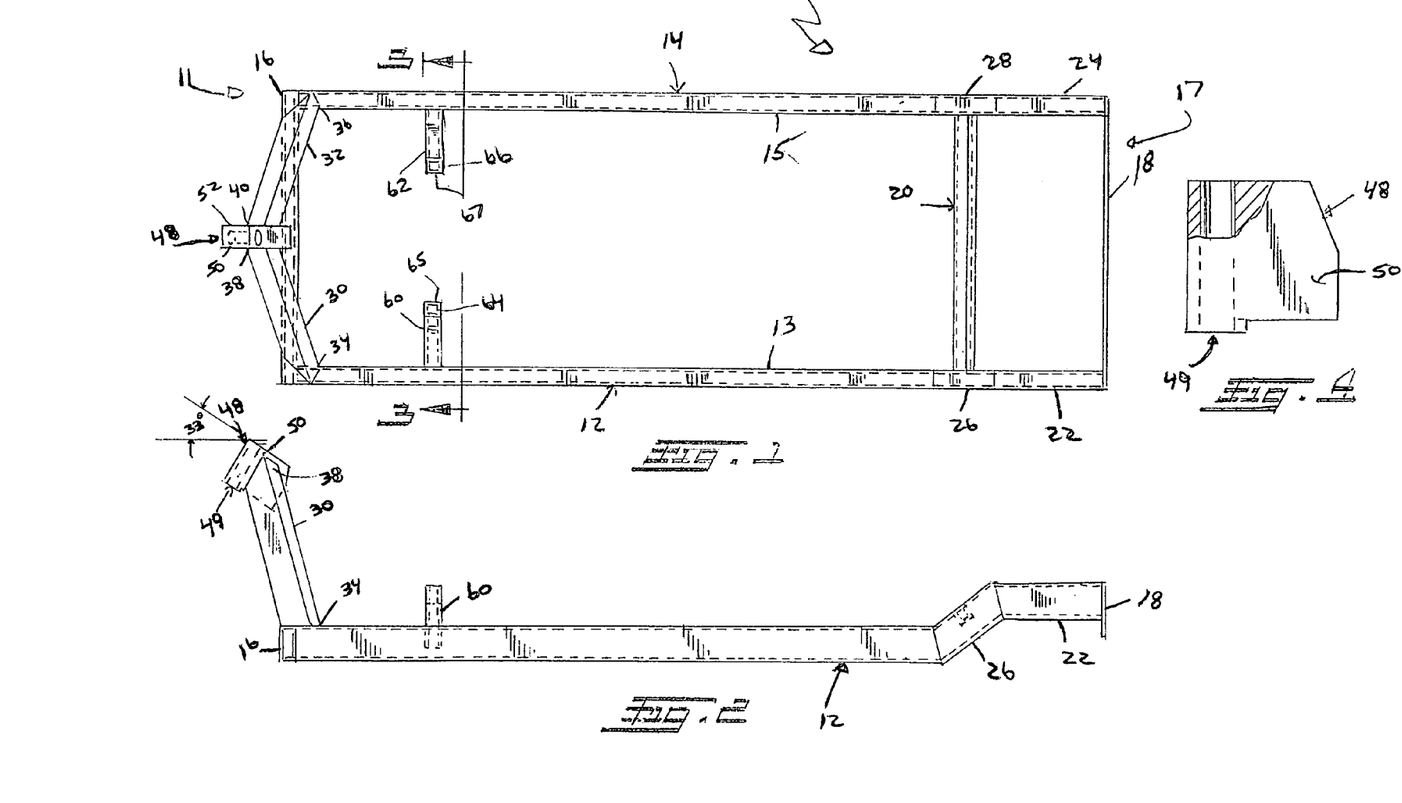
FIG. 1 is a plan view of the frame construction according to the invention.
FIG. 2 is a side elevation view of the frame construction according to the invention.
FIG. 4 is an exploded view of the front headpiece.
Figures 3, 5, 6, 7:
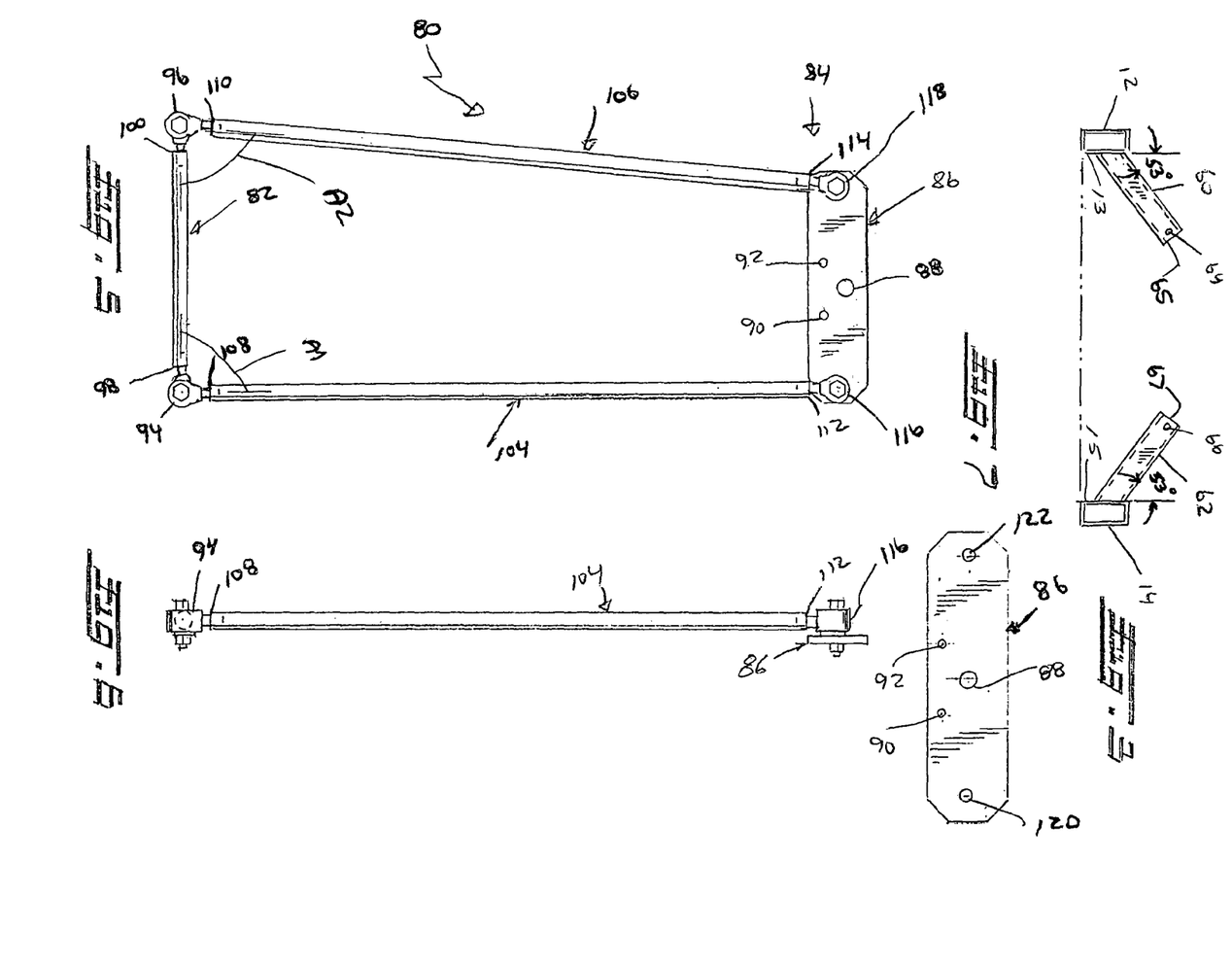
FIG. 3 is an enlarged sectional view taken along line 3—3 in FIG. 1.
FIG. 5 is a plan view of the steering mechanism according to the invention.
FIG. 6 is a side elevation view of the steering mechanism.
FIG. 7 is an enlarged plan view of rear mounting plate of the steering mechanism.

Referring now in greater detail to the drawings, in which the showings are for the purpose of illustrating preferred embodiments of the invention only, and not for the purpose of limiting the invention, FIGS. 1–4 of the drawings illustrate a frame construction having a rigid open box frame 10 primarily of tubular steel (e.g. stainless steel, carbon steel plated with chrome, nickel alloys, titanium alloys, etc.) including two primary side rail tubes 12, 14, a front rail tube 16 and a rear steel plate 18. The primary side rails 12, 14 are spaced from each other and adjoined at frame front end 11 by front rail tube 16. The frame 10 further includes two upwardly and rearwardly angled side rail tubes 26, 28 which respectively connect the primary side rails 12, 14 to a pair of secondary side rail tubes 22, 24. The secondary side rails 22, 24 are spaced from each other and adjoined at frame rear end 17 by rear plate 18. Frame 10 includes an additional tubular cross member 20 mounted between the angled side rails 26, 28 transverse to side rails 12, 14. Angled side rails 26, 28 are cut and welded in such a fashion to allow secondary side rails 22, 24 to be positioned in a plane parallel to, but non-coplanar with primary side rails 12, 14, as shown in FIG. 2. The frame 10 also includes a pair of support bars 30, 32 mounted at their lower ends 34, 36 on side rails 12, 14 and front rail 16. Support bars 30, 32 extend upward, over and forwardly of front rail 16 of frame 10. Support bars 30, 32 are connected at their respective upper ends 38, 40 to opposing sides 50, 52 of a head tube 48. The head tube 48 is used for mounting a single front wheel assembly 53 (see FIGS. 8–10) on the frame 10. Head tube 48 includes a passage 49 for receiving a fork tube, not shown, of the front wheel assembly 53. The head tube 48 may be tilted rearward approximately 30°–40° from horizontal (FIG. 2). In one non-limiting arrangement, the head tube 48 is tilted rearward about 33° from horizontal. As shown in FIG. 3, a pair of tubular motor mount members 60, 62 are mounted on side rails 12, 14, respectively, proximate to front rail 16. Motor mount members 60, 62 are affixed to inside edges 13, 15, respectively, of side rails 12, 14 and extend upwardly and inwardly thereof. Motor mount members 60, 62 include mounting holes 64, 66, respectively, at upper ends 65, 67. The motor mount members 60, 62 extend inwardly approximately 50°–60° from vertical (FIG. 3). In one non-limiting arrangement, the motor mount members 60, 62 extend inward about 53° from vertical. The mounting holes 64, 66 and mount members 60, 62 provide an arrangement to fixedly connect the motor to the frame 10 through the use of, for example, motor mount bolts 69.

FIGS. 5–7 of the drawings illustrate a steering arrangement or mechanism 80 which includes a tubular steel front steering bar 82 connected to the front wheel assembly 53 of the vehicle distal to a driver. The steering mechanism 80 is supported at its rear end 84 by a rear steel mounting plate 86. The rear mounting plate 86 includes a mounting hole 88 located generally in a centered position. A mounting rod 89 (see FIGS. 8–11) is rigidly attached in mounting hole 88 passing through mounting plate 86. The mounting rod 89 pivotally connects the mounting plate 86 to the vehicle body proximate to the driver.

The front steering bar 82 includes two pivotal joints 94, 96, i.e. heim joints, mounted at opposing ends 98, 100 of steering bar 82. Joints 94, 96 connect steering bar 82 to a pair of tubular steel connecting rods 104, 106 at their front ends 108, 110, respectively. Connecting rods 104, 106 at their respective rear ends 112, 114 are attached to heim joints 116, 118, for example, 3/4 inch heim joints. Joints 116, 118 are mounted in holes 120, 122 at opposing ends of mounting plate 86. Additionally, mounting plate 86 includes two mounting holes 90, 92 for connecting the handlebars 93 (see FIGS. 10 and 11) to the rear mounting plate 86. A pair of connectors 95, 97 are provided and mounted in holes 90, 92, for rigidly connecting the handlebars 93 to the mounting plate 86. The front steering bar 82 includes two additional joints 83, 85 which connect the front steering bar 82 to the front wheel assembly 53. The front steering bar 82 and the connecting rods 104, 106 can be, for example 1 inch diameter tube steel. As will be appreciated from FIG. 5, front bar 82 is longer than rear plate 86, and connecting rod 106 is longer than connecting rod 104, and at an angle thereto.

Referring now to FIG. 5, connecting rod 104 and the steering bar 82 define an angle A1. Similarly, connecting rod 106 and the steering bar 82 define another angle A2. The angle A1 between connecting bar 104 and steering bar 82 is greater than the angle A2 defined by connecting rod 106 and steering bar 82 when the front wheel assembly 53 is in a straight, or non-steering, orientation. This provides for mounting plate 86 on the vehicle such that a passenger compartment or seating arrangement (not shown) can accommodate the driver and a passenger side-by-side with the axis of the handlebar 91 laterally offset relative to the front wheel assembly 53 and directly in front of the driver.

Figure 8:
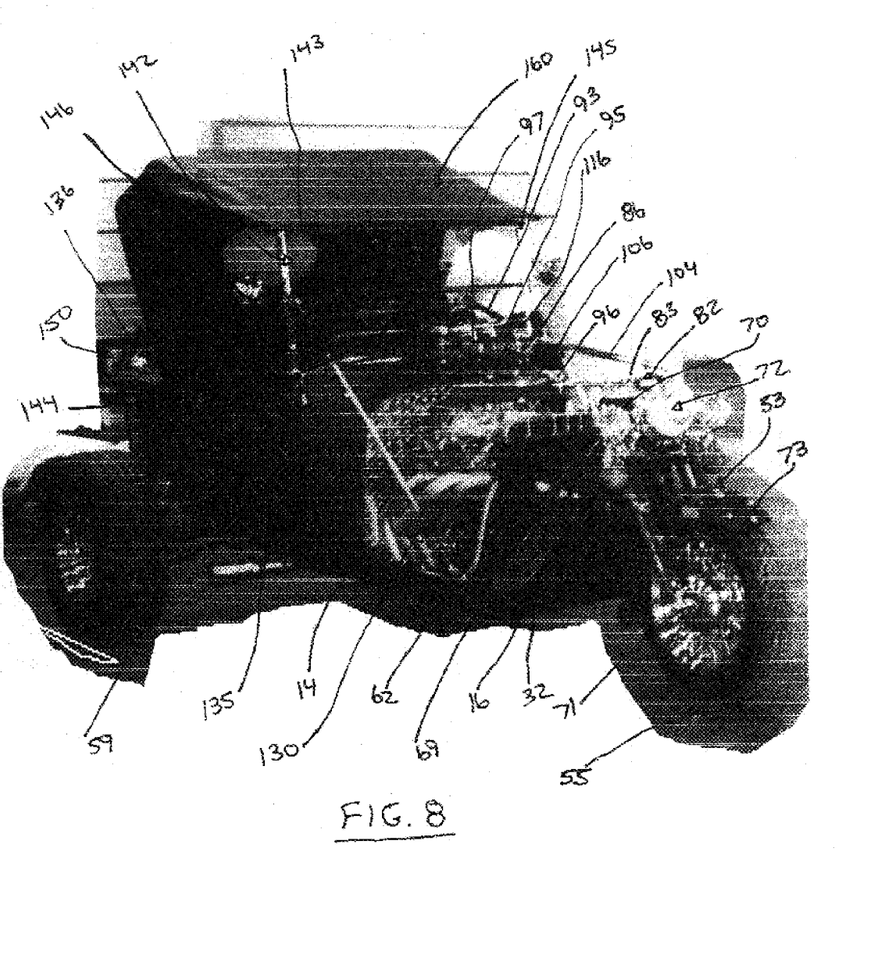
FIG. 8 is a perspective view of a three-wheel vehicle according to the invention.
Figure 9:
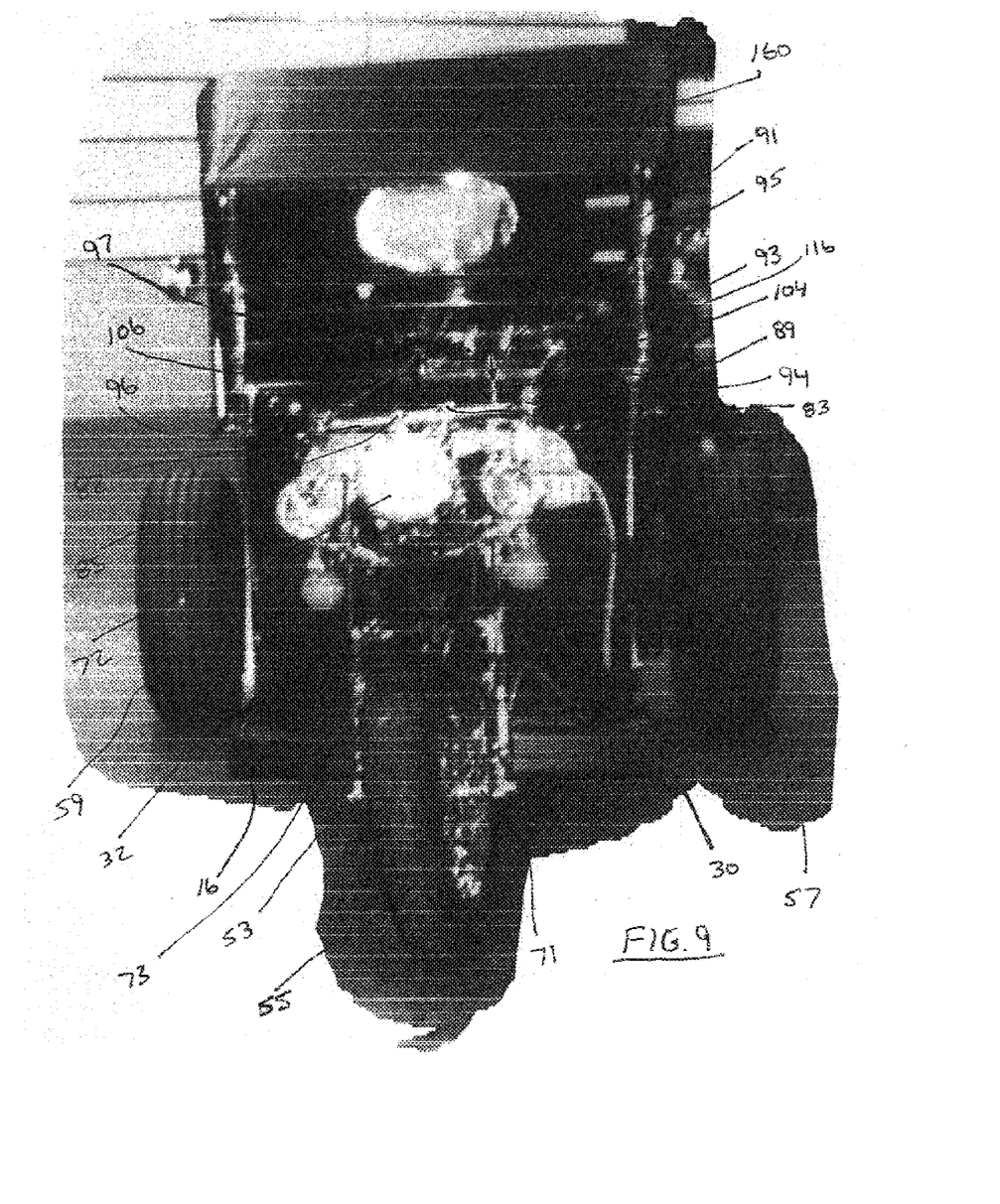
FIG. 9 is a front perspective view of a three-wheel vehicle according to the invention.
Figure 10:
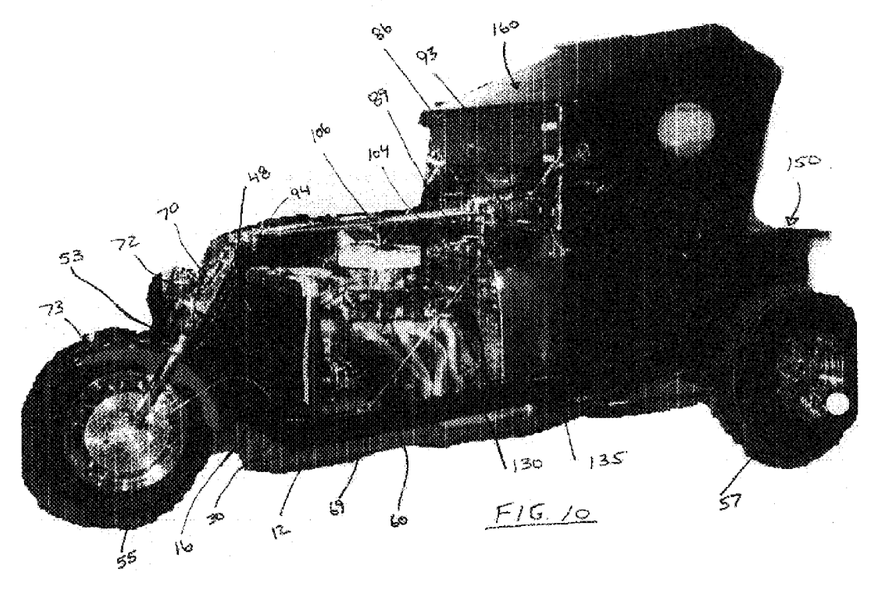
FIG. 10 is a side perspective view of a three-wheel vehicle according to the invention; and, FIG. 11 is an enlarged perspective view of the steering mechanism according to the invention.
Figure 11:
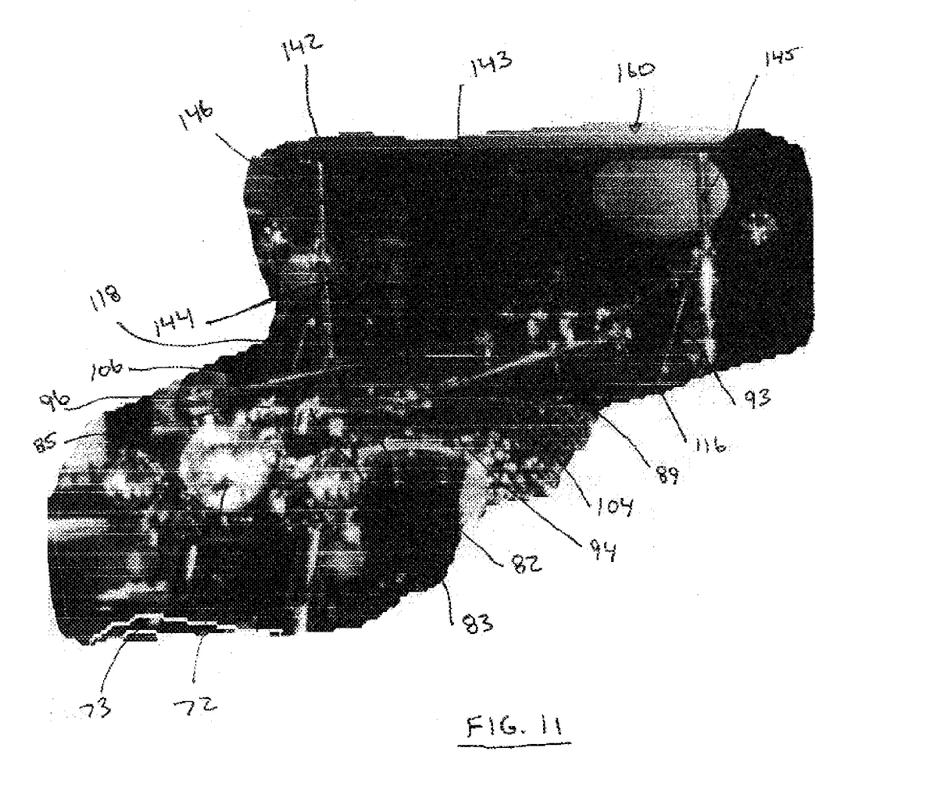

Referring next to FIGS. 8–10, illustrated therein is a vehicle having the characteristics generally noted above. The vehicle includes three wheels such as a front wheel 55 and two rear wheels 57, 59. These wheels are typically of pneumatic type; however, other types of wheels can be used. Each wheel, for example, consists of a tire, spokes or rim, and a hub.

The vehicle comprises the frame 10, a motor arrangement 130, a vehicle body 135, the seating arrangement, a fuel storage arrangement 150, and the steering mechanism 80. The vehicle may also include a canopy arrangement 160. The frame 10 of the vehicle can be fabricated of welded steel tubing or other types of durable materials. The vehicle body 135 may, for example, be a prefabricated fiberglass open top body. The body 135 will typically extend from one side rail to the opposing side rail.

As discussed above, the frame 10 consists of two primary side rails 12, 14. The primary side rails 12,14 include two support bars 30, 32 extending upwardly, over and forwardly of the front rail 16 of the frame 10. The support bars 30, 32 are connected to opposing sides of the head tube 48. As described above, the head tube 48 is of generally vertical attitude, but typically slopes rearwardly. The fork tube of the front wheel assembly 53 can be inserted into the passage 49 of the head tube 48. The front wheel assembly may be, for example, a Harley-Davidson® model front wheel assembly. The fork tube is pivotal within the passage 49. A yoke 70, for example, can be mounted on the fork tube. The yoke 70 straddles the front wheel 55 to which it is connected, such as, for example, at free wheeling axle 71 to permit rotation of the wheel 55 and a steering of the latter by means of the steering mechanism 80. As described above, the front steering bar 82 includes two joints 83, 85 which rigidly connect the front steering bar 82 to the yoke 70 on the front wheel assembly 53. A headlamp 72 may be mounted on the yoke 70, as may be a fender 73 which shields the wheel 55.

The motor arrangement 130 of the vehicle is supported by the primary side rails 12, 14. Additionally, the motor arrangement 130 is connected to a pair of motor mounts 60, 62 extending upwardly and inwardly from the primary side rails 12, 14. As described above, the motor mounts 60, 62 are of generally vertical attitude, but typically extend inwardly toward each other. The motor arrangement 130 can be, for example, a V-4, V-5, V-6, V-8 or V-12 engine, which is used to power, for example, an automatic transmission connected to the rear drive train. A throttle mechanism can be mounted to the end of the handlebar 93 and operated similar to a motorcycle. A braking mechanism can be mounted to the floor of the seating arrangement. It is to be appreciated that the motor arrangement 130 is located between the primary side rails 12, 14 and proximal to the front rail 16.

The seating arrangement of the invention can include a seat having safety belts in operative association therewith. The safety belts are so disposed so as to accommodate a driver and at least one passenger in side by side relationship. The breadth of the seat may be about three (3) feet, thereby comfortably accommodating two adults in side by side relationship.

A fuel storage arrangement 150 is provided rearward of the seating arrangement. The cross member 20, rear plate 18, and secondary side rails 22, 24 support the rear of the seating arrangement and the fuel storage arrangement 150.

The vehicle body 135 can include a windshield 142 extending vertically from a front end of the body 135. A canopy arrangement 160 can also be provided connecting a top edge 143 of the windshield 142 with a rear edge 136 of the vehicle body 135. The canopy arrangement 160 provides shelter from the elements for occupants inside the seating arrangement 140. As shown in FIG. 8, an opening 144 is provided in the windshield 142 whereby the handlebars 93 extend through the opening 144. The opening 144 extends from one side 145 of the windshield 142 to the other side 146, thereby providing space for lateral movement of the handlebar 93 within the opening 144.

As shown in FIG. 9, the connecting rods 104, 106 provide a transverse jog or offset, the purpose of this offset and the location of the handlebars 93 is to make the vehicle especially adapted for operation in carrying an operator by himself or an operator in conjunction with a passenger so that the offset of the handlebars 93 facilitates operation of the vehicle with the operator offset from a central location.

In operation, an operator grasps the ends of the handlebars 93 and as the operator moves the handlebars 93 laterally left and right, the rear mounting plate 86 pivots accordingly. The pivoting action of the rear mounting plate 86 correspondingly moves the connecting rods 104, 106 alternatively forward and backwards relative to the front wheel assembly 53. The action of the connecting rods 104, 106 in turn moves the ends 98, 100 of front steering bar 82 forward and rearward thereby turning the yoke 70 and front wheel 55 either to the left or to the right corresponding to the movement of the operator. Varying the lengths of the connecting rods 104, 106 allows for selectively locating the non-centered operator position.

While considerable emphasis has been placed herein on the structures and configurations of preferred embodiments of the invention, it will be appreciated that other embodiments, as well as modifications of the embodiments disclosed herein, can be made without departing from the principles of the invention.

Having thus described the invention, it is claimed:

1. A frame and steering arrangement for a three-wheel vehicle comprising:
   a rigid, open box frame comprising primary and secondary side rails spaced from each other and joined at opposite ends by a front rail and a rear plate;
   a plurality of mounting components adapted for mounting an associated vehicle engine on the frame adjacent to and rearwardly of the front rail;
   first and second support bars each having lower ends, said lower ends are mounted on an upper edge of said primary side rails and said front rail, said first and second support bars and extending over and forwardly of said front rail of said frame;
   said first and second support bars at upper ends connected to a head tube adapted to mount a front wheel assembly on said frame;
   a steering assembly having a front steering bar to connect to said front wheel assembly;
   said steering assembly including a rear mounting plate pivotal relative to said frame and located rearwardly of said front wheel assembly;
   a pair of connecting rods of different lengths pivotally connected between said steering bar and said rear mounting plate whereby said mounting plate is pivotal about an axis laterally offset from said front wheel assembly; and,
   said pair of connecting rods coplanar with said front steering bar.

2. The frame and steering arrangement according to claim 1, wherein said pair of connecting rods are positioned in a first plane and said primary side rails are positioned in a second plane, said first plane is generally parallel to, but non-coplanar with said second plane.

3. The frame and steering arrangement according to claim 1, wherein each said connecting rod includes a front end and a rear end, said front ends of said connecting rods define a first distance therebetween and said rear ends of said connecting rods define a second distance therebetween, said first distance is greater than said second distance.

4. The frame and steering arrangement according to claim 1, wherein said head tube includes a passage therethrough for receiving a fork tube of said front wheel assembly.

5. The frame and steering arrangement according to claim 1, wherein said head tube tilts rearward from about 30° to 40° from a horizontal axis.

6. The frame and steering arrangement according to claim 5, wherein said head tube tilts rearward about 33° from a horizontal axis.

7. The frame and steering arrangement according to claim 1, wherein said frame includes a cross member mounted between a pair of angled side rails.

8. The frame and steering arrangement according to claim 7, wherein said angled side rails extend upwardly and rearwardly with respect to said primary side rails, said angled side rails connect said primary side tails to said secondary side rails.

9. The frame and steering arrangement according to claim 8, wherein said secondary side rails are positioned in a third plane and said primary side rails are positioned in a second plane, said third plane is generally parallel to, but non-coplanar with said second plane.

10. The frame and steering arrangement according to claim 1, wherein said mounting components comprise first and second motor mount members, each having a lower end, said lower ends connected to a respective inside edge of said primary side rails, said first and second motor mount members extending inwardly and upwardly from said primary side rails.

11. The frame and steering arrangement according to claim 10, wherein said motor mount members extend inwardly from about 50° to 60° from a vertical axis.

12. The frame and steering arrangement according to claim 11, wherein said motor mount members extend inward about 53° from a vertical axis.

13. The frame and steering arrangement according to claim 1, wherein said pair of connecting rods comprise a first connecting rod and a second connecting rod, said first connecting rod and said steering bar define a first angle, said second connecting rod and said steering bar define a second angle, said first angle greater than said second angle when said front wheel assembly is in a straight position.

14. A steering arrangement for a three-wheel vehicle comprising:
    a steering assembly having a front steering bar to connect to a front wheel assembly;
    said steering assembly including a rear mounting plate pivotal relative to a frame and located rearwardly of said front wheel assembly;
    a pair of connecting rods of different lengths pivotally connected between said steering bar and said rear mounting plate whereby said mounting plate is pivotal about an axis laterally offset from said front wheel assembly;
    said pair of connecting rods are positioned in a first plane;
    the three-wheel vehicle having a frame arrangement including a pair of primary side rails positioned in a second plane, said first plane is generally parallel to, but non-coplanar with said second plane; and,
    said pair of connecting rods coplanar with said front steering bar.

15. The steering arrangement according to claim 14, wherein each said connecting rod includes a front end and a rear end, said front ends of said connecting rods define a first distance therebetween and said rear ends of said connecting rods define a second distance therebetween, said first distance is greater than said second distance.

16. The steering arrangement according to claim 14, wherein said pair of connecting rods comprise a first connecting rod and a second connecting rod, said first connecting rod and said steering bar define a first angle, said second connecting rod and said steering bar define a second angle, said first angle greater than said second angle when said front wheel assembly is in a straight position.

* * * * *